May 22, 1951      KAI-KOBAD S. KUKA      2,554,036
MAGNETIC HOIST CONTROLLER FOR TRAVELING CRANES
Filed May 21, 1948
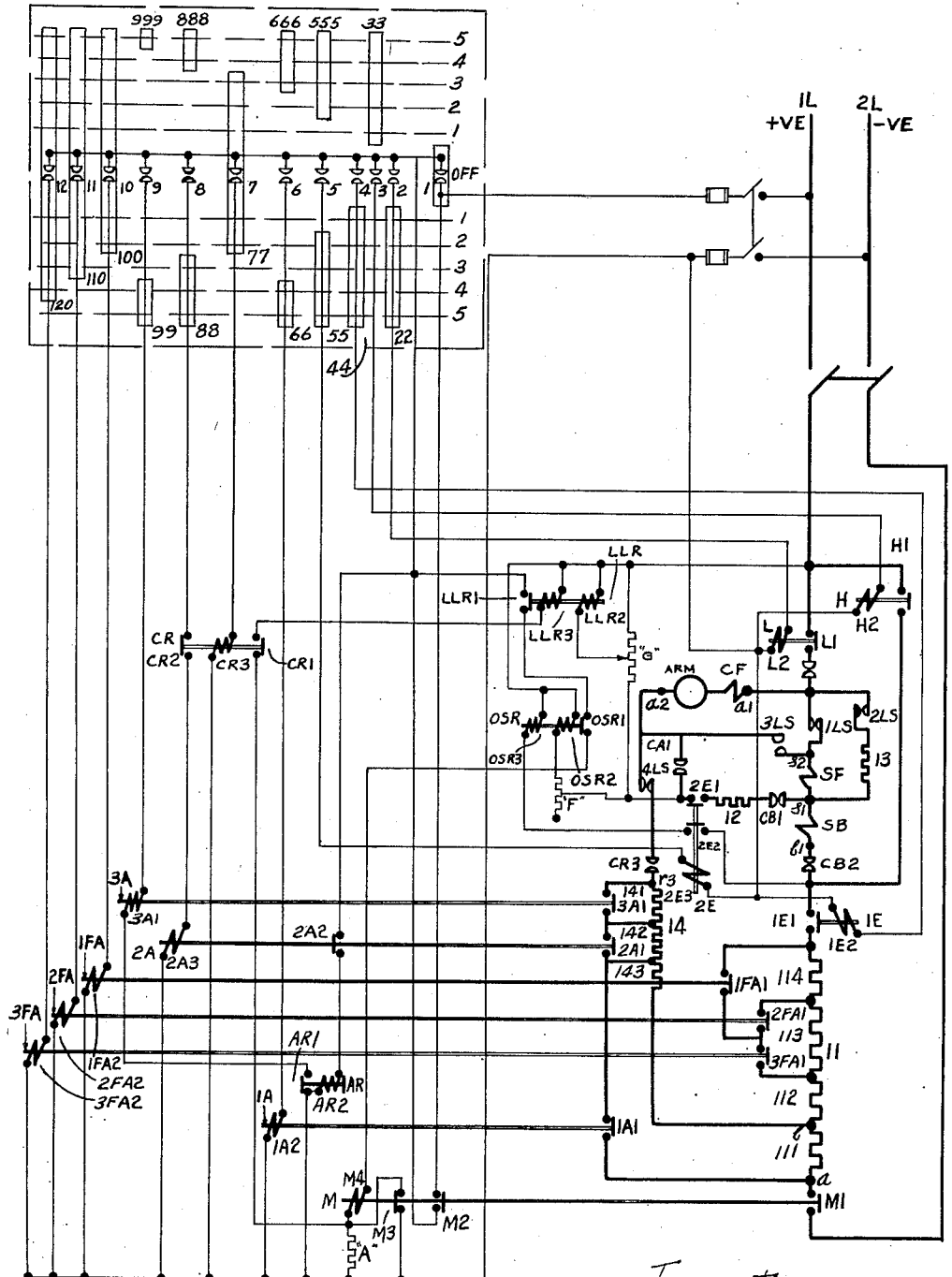
Inventor
K. S. Kuka
By
C. F. Wenderoth
Attorney Patented May 22, 1951

2,554,036

UNITED STATES PATENT OFFICE 2,554,036

MAGNETIC HOIST CONTROLLER FOR TRAVELING CRANES

Kai-Kobad S. Kuka, Jamshedpur, India, assignor to The Tata Iron & Steel Co. Ltd., Jamshedpur, India Application May 21, 1948, Serial No. 28,413 In India February 10, 1948

5 Claims. (Cl. 318—6)

This invention relates to magnetic hoist controllers for electrical direct current operated overhead travelling cranes.

Magnetic hoist controllers for electrical overhead travelling cranes are today based on almost a standardized method, though the designs of different manufacturers differ in details and in the method of sequence of operation. However, every modern controller still has certain intrinsic limitations, which make themselves felt during control circuit faults, which cause extreme overspeeding of the load during lowering, resulting in severe damage to the hoist equipment and possible hazards to persons working below.

The main cause of the racing of the load is due to sudden failure of the dynamic braking action of the hoist motor, especially when a heavy load is being lowered at fast speeds. When the racing once occurs, even if an alert crane driver brings the controller immediately to the "off" position to allow the brake to settle, often the brake is not able to stop the motion, if not very carefully and tightly adjusted to hold the load at that extreme high speed. It is not always convenient to adjust the series brake too tight, as it would then fail to release properly during fast lowering movements of the master switch, causing further troubles.

The sources of troubles as observed from experiences which cause over-speeding of the load during lowering are:

(a) Trolley cross-bar current collector for the motor armature which is the weakest point, as it can create a break in the dynamic braking circuit at any time.

(b) Series type overhoist automatic reset limit switches which are a standard overhoist protection, are a source of extreme danger, if the counter-weight rope snaps or opens out allowing the limit switch to turn over, while a heavy load is being lowered at high speeds.

(c) On the trolley, a connecting cable has to be taken between the series field and the series brake. If that cable gets grounded (the causes of ground faults on crane wiring are many and varied): the ground fault, if it takes place under unfavorable conditions, is found to be the most dangerous of all faults, as the brake tends to remain lifted even if an alert driver brings the controller quickly to "off" position, as he sees the load racing downwards.

The object of this invention, generally speaking, is to prevent overspeeding of the crane hook by controlling the electromechanical brake in such a way that whenever a heavy load tends to overspeed due to failure in the electrical braking action while being lowered, the motor is disconnected from the power line and the electromechanical brake sets in to hold the load before racing takes place.

More specific object of the invention is to provide electromagnetic relays, so connected to the motor armature and the motor series fields, that the relays operate to deenergize the whole electric control of the motor in case of any electrical faults in the electrical circuit which fault tends to reduce the dynamic braking action of the motor during lowering of a heavy load and thereby causing the dangerous overspeeding of the load.

For a better understanding of the invention, reference may be made to the following description taken in conjunction with the accompanying drawing wherein, the figure is a schematic illustration of a control system wherein the features pertaining to my invention are introduced.

In the drawing, an electric motor of the direct current series type is shown provided with an armature (ARM), commutating fields (CF) and series fields (SF), which may be suitably coupled to the operating mechanism of a crane hoist. Since the construction of the crane hoist mechanism and the manner of installing the motors for operating them, as well as that of mounting of the electro-mechanical brakes are well known, it is not deemed necessary to illustrate them. Notation (SB) denotes the series type operating coil of the electro-mechanical brake which is mounted on the motor shaft extension (not shown).

A master controller MC with a number of cam operated contacts is provided to control the operation of the motor. The contact segment 11 is disposed to engage the contact finger 1 so that as long as the two are engaged, the contacts are closed and the circuit is made complete. Thus contacts 2 of the master controller MC close when they are engaged to the segment 22 and so on for the other contacts in sequence.

The operation of the controller is therefore as follows:

HOISTING CYCLE

As soon as the control power is put on by closing the main switch and the control knife switch, the power circuit becomes complete from the line 1L over the contacts 1 of the master switch MC, over the contacts LLR1 of the relay LLR, over the contacts OSR1 of the relay OSR, over the operating coil M4 of the main contactor M to the negative line 2L. If, therefore, all the contacts in question are closed, the contactor M is energized and its main contacts M1 close. When M1 closes, its coil M4 gets permanently connected over its holding contacts M2 which also close when the coil is energized. The contactor M thus remains energized for all positions of the master switch MC. When the master controller is moved to first position in the hoist direction, its contacts 3 engage with the segment 33 and thus get closed. This energizes the coil H2 of contactor H, which closes its main contacts HI. Power then flows from the positive line IL over the closed contacts HI, then passes over the trolley cross-bar collectors CB2, over the series coil SB of the electro-mechanical brake, through the series fields SF, over the normally closed contacts ILS of the overhoist limit switch, through the motor commutating fields CF and the motor armature (ARM), over the other set of closed contacts 4LS of the overhoist limit switch, over the trolley cross-bar collector CR3, through the resistances 14, then over the resistance step 111, over the contacts MI, back to the negative line 2L. The motor is thus connected as a straight series motor over the control resistances, and rotates in the hoisting direction, because the series brake also gets energized and releases its holding shoes. To increase the motor speed, the master controller is moved further to points 2, 3, 4 and 5, which in sequence energizes the contactors 2E, IA, 2A and 3A, allowing the control resistances 12, 14 and 111 to be removed from the motor circuit. On the fifth notch, the motor gets connected directly on to the power lines IL and 2L, which gives the maximum hoisting speed.

OVERHOIST LIMIT SWITCHES

Overhoist limit switch is indicated by the contacts ILS, 2LS, 3LS and 4LS. The contacts ILS and 4LS remain closed in the normal operation, and 2LS and 3LS remain open. The limit switch is kept in its normal position by means of a counter-weight hanging from an operating lever. This counter-weight is so fitted that when the crane hook pulley block is overhoisted, the counter-weight is lifted. The weight hangs from the limit switch lever by means of a thin steel wire rope, and the rope becomes slack. The counter-pull on the limit switch lever is thus released, which permits the switch to operate through a spring provided with the switch. The spring operates the switch in such a direction that the contacts ILS and 4LS open, and the contacts 2LS and 3LS close.

In series with the contacts 2LS, a resistance 13 is provided, mounted on the trolley near the limit switch itself. When the limit switch turns over due to overhoisting of the hook block, i. e., when the contacts ILS and 4LS open, while the contacts 2LS and 3LS close, the motor gets disconnected from the line at the contacts 4LS. However, the connections over the contacts 2LS and 3LS are such that a heavy dynamic braking force is applied by the motor, which brings the motion of the hook block to a quick stop. The hoisting motion is thus arrested and the load can no more be hoisted even if the controller is moved further in the forward direction. Thus an automatic protection again overhoisting is provided in a standard controller.

LOWERING CYCLE

Moving the master controller to the lowering direction, on the first point, contacts 2 engage with segment 22 and contacts 4 engage with segment 44, which makes the circuit to coils L2 and IE2 of contactor L and IE. The contactors are thus energized and contacts LI and IEI close. The current thus flows from positive line IL over the closed contacts LI, over the trolley cross-bar collector CAI. After CAI, the current divides into two paths, one path flowing along the point (a1) through the commutating field CF and the armature (ARM) and the other over the limit switch closed contacts ILS over the series fields SF, the brake coil SB and over the resistances 11; and the point (b), the branch currents again combine, and flow over the resistance 111 and back to the negative line 2L over the main contacts MI. Thus during lowering, the motor armature and the motor series fields are separately excited, connected in parallel, which gives the motor a shunt characteristic while lowering.

Between the point (S1) of the series fields SF and the point (a2) of the armature (ARM) a loop circuit is taken starting from point (s1) between the series field SF and the brake coil SB, taken over the trolley cross-bar collector CB1, thence over the resistance 12 to the normally closed contacts 2E1 of the spring-closed electromagnetic contactor 2E, over the trolley cross-bar collector CA1, to the point (a2) of the armature (ARM). The loop circuit is thus formed parallel to the armature. This circuit gives slow controlled speeds of the motor.

When the master switch MS is moved to second point lower direction, segment 55 engages the contacts 5. This gives power to the coil 2E3 of the contactor 2E. Energizing of 2E contactor opens its normally closed main contacts 2E1. The loop circuit parallel to the armature is thus opened and the motor speed increases. The resistances 11 are in the series field circuit which control the motor field current, and the resistances 14 are in the armature circuit which control the armature current. Increasing or decreasing the resistances in the field circuit (resistances 11), or in the armature circuit (resistances 14), controls the lowering speed of the motor. As the master switch MC is moved forward in the direction of lowering to points 3, 4 and 5, contactors 1A, 2A and 3A are energized, closing their main contacts 1A1, 2A1, and 3A1, thus shorting the resistances 111, 141, 142 and 143, which connect the motor armature direct on the power lines, impressing the full line voltage across the armature. The contacts 10, 11 and 12 of the master switch MC are so arranged that they remain engaged with their segments 100, 110 and 120. Thus the master switch contacts 10, 11 and 12 remain normally closed. This keeps the coils 1FA2, 2FA2 and 3FA2 of the contactors 1FA, 2FA and 3FA normally closed, thus shorting the series field resistances 112, 113 and 114. The motor field is thus fully excited at the start. However, at the point 3 of the master switch in the lowering direction, contacts 10 are disengaged from the segment 100. The contactor 1FA is thus de-energized and its main contacts 1FA1 open out. Resistance 114 is thus introduced in the field circuit which weakens the motor field, and increases the speed of the motor. At master switch points 4 and 5 in the lower direction, the contacts 2FA1 and 3FA1 open out in sequence, giving maximum field weakening which gives the maximum motor speed.

DYNAMIC BRAKING EFFECT

As during lowering, the series field loop circuit and the motor armature loop circuit are connected in parallel across the power lines, the motor works as a normal shunt motor while handling light loads which are lowered by the motoring action. However, when heavy loads are being lowered, the load itself tends to drive the whole hoist mechanism due to gravity action. Thus heavy loads tend to drive the motor by their own overhauling action. As the motor is connected to the power lines and driven mechanically by the overhauling load, the motor tends to become a generator and develops a counter-torque which opposes the driving force of the load, which balances the speed of the motion. This generator counter-action of the motor during lowering is called dynamic braking action. The action of the motor in producing either motoring torque to lower light loads, or the dynamic braking torque to control heavy loads is automatic and a fundamental main feature of a magnetic hoist electrical control system.

If, due to any cause, the dynamic braking action of the motor fails to be effective while lowering a heavy load, the load will tend to accelerate at a heavy unrestrained speed under the action of gravity. The speed thus obtained goes beyond safe maximum limiting speed of the motor armature and the hoist gear mechanism, which will be destroyed, if the speed is not arrested in time.

It is the object of my invention to design a circuit which affords an automatic protection against the failure of dynamic braking action of the electric control system during lowering of loads on a crane hoist service, which is independent of the human element.

The more common faults which produce the failure of dynamic braking action and consequent overspeeding and racing of the load are now described with reference to the accompanying drawing:

(a) The trolley cross-bar collector in the armature loop, marked CR3 in the diagram, causes an open circuit of the armature loop, either because it breaks or gets lifted. A break can as well lie at any point beyond CR3. This is a frequent source of trouble. This is referred to as "open circuit in the armature loop." (A break can as well occur in the motor armature itself. However, armatures and series field coils develop ground faults or internal shorts, rather than open breaks in the conductor. Such armature faults are normally taken care of by overload relays.)

(b) Overhoist limit switch accidently turns over due to its counterweight getting detached from the holding rope while an overhauling load is being lowered at high speeds.

This is referred to as "Faulty operation of hoist limit switch."

(c) The connecting cable between series field and series brake may get grounded. Causes of ground faults on a steel mill crane working under severe and rough conditions are many and diverse. It is also possible that ground fault may occur on the series field coils. Depending on the insulation condition of the whole distribution system, this fault may bridge-over the series field. However, the brake remains lifted all the time. As the series field fails, the motor dynamic braking action also fails, causing overspeeding of the load. In most controllers, this can be stopped only if the driver disconnects the whole crane power supply by operating an emergency switch provided for the purpose in the driver's cabin.

According to this invention, I provide an overspeed relay consisting of two coils, one coil connected across the armature of the motor and the other coil connected across the field and the brake, such that whenever a fault causes overspeeding due to the failure of the dynamic braking action on account of open circuit in the armature loop as herein defined, the coil across the armature of the motor comes into operation, and if the failure of the dynamic braking action is due to the faulty operation of the hoist limit switch, then the coil across the field and the brakes comes into operation, with the result that one or the other coil of the over-speed relay always comes into action as a result of the defects referred to above and the said relay operates and disconnects the armature, the field and the brake from the main power line, thus de-energizing the brake which at once sets in to arrest the motion of the hoist.

The invention will now be more fully described with reference to the accompanying drawing:

The magnetic voltage relay claimed under this invention is termed OSR (over speed relay) as shown connected in the drawing. The relay has two independent coils on the same magnetic core. The coil OSR2 of the relay is connected with one terminal to the common point of connection between main contacts H1 and L1 of contactors H and L, and the other terminal of the coil OSR2 is connected to the contact of the main contacts 2E1 of contactor 2E which in turn is connected to the cross-bar collector CA2. A variable resistance marked F is put in series with the coil OSR2 for the purpose of proper setting and adjustment.

The other coil OSR3 of the relay OSR is connected with its one terminal in the same way as the first terminal of coil OSR2, while its other terminal is connected to the common connection between the main contacts of contactors H and 1E, the contact of 1E contactor being the one connected to the cross-bar collector CB2. The coil OSR3 of relay OSR is moreover interlocked with 2E contactor, i. e. it is connected to the circuit over auxiliary normally open contacts 2E2 of 2E contactor, i. e. the coil OSR3 comes into circuit only when 2E contactor is energized, when 2E1 main contacts open, and 2E2 auxiliary contacts close.

The coil OSR3 is designed to pull in the relay armature when 40 volts are applied to its terminals. This can be adjusted by the spring tension. The coil OSR2 with resistance F in series with it is so adjusted that the relay pulls in for 260-265 volts.

The relay OSR has one set of normally closed contacts OSR1; the contacts OSR1 remain closed as long as the relay does not pull in. The contacts are introduced in the control line of the coil M4 of the main contactor M. When, therefore, the relay OSR operates opening its contacts OSR1, the contactor M gets de-energized and its plunger drops out opening its contacts M1 and M2. The whole control thus gets de-energized, and the motor gets thus disconnected from the power lines. The electro-mechanical brake also gets de-energized and resets to hold the load to a standstill. The panel can then be restarted only when the master switch MC is brought back to "off" position.

OPERATION OF RELAY OSR

*Condition a.—Overspeeding due to break in armature loop at or beyond trolley crossbar collector CR3 in the drawing*

As soon as there is a break in the armature loop at the point CR3 or beyond, the armature dynamic braking action fails. As the series field circuit is still energised, the brake remains lifted and the load tends to race downwards. This causes a rapid rise of voltage between the points $a_1$—$a_2$ of the armature. This voltage is applied on the coil OSR2 of relay OSR. As soon as the voltage reaches 260 volts, for which the relay is set to pull in, the contacts OSR1 of the relay OSR open which de-energises the coil M3 of the contactor M, which open out the contacts M1 and M2, disconnecting the whole motor from the line. The action is so rapid that the electro-mechanical break settles down to hold the load before it has time to accelerate to any great extent.

*Condition b.—Overspeeding due to failure of dynamic braking action of the motor if overhoist limit switch accidentally turns over when a load is being lowered*

When the limit switch has turned over during lowering, the armature dynamic braking loop circuit opens out at the limit switch contact 4LS. The armature and the series field together get connected in the closed loop over the limit switch contacts 2LS and 3LS which are closed due to the limit switch operation. Though the circuit gives a slow speed motoring action in the lower direction with empty hook, the dynamic braking action with overhauling load on the hook fails, causing severe overspeeding of the load due to gravity. Under that condition, the OSR3 coil of the relay OSR, which gets connected across the circuit of armature, series field and series brake, which come in straight series connection due to the closing of the limit switch contacts 3LS. The voltage conditions then become such that the coil OSR3 of OSR gets more than its minimum operating voltage of 40 volts. The relay therefore pulls in at once and de-energises the whole controller, which arrests the motion of the load at once, as the electro-mechanical brake resets and holds the load to standstill.

The relay OSR is interlocked with 2E contactor over the contacts 2E2. This is to permit the automatic re-setting of the overhoist limit switch after it has been tried and tested for its effectiveness by overhoisting the hook block. This test is carried out as a routine once every day on all the important cranes. The relay OSR permits the re-setting of the overhoist limit switch only on the first notch lowering point of the master switch.

This is another great advantage of the relay OSR. In every standard controller, there is nothing to prevent the operator to try and re-set the limit switch by indiscriminately throwing the controller to its last point. When this is done, the armature gets a very heavy current kick because, by the time the over-hoist limit switch re-sets, the panel has already accelerated. This connects the armature directly across the line with all the resistance shorted, when the limit switch resets. The current kicks are so heavy that main circuit breaker in the power house often trips off causing a complete shut down. The relay OSR prevents this automatically as it does not allow the operator to re-set the limit switch beyond the first notch of the master switch; if he tries to do otherwise, the brake will drop and prevent movement.

The coil OSR3 of OSR relay is connected to the common point between 1E1 contacts and CB2 cross-bar collector as it then controls the condition of contact of the crossbar collector CB2. Very often this collector makes a bad contact causing excessive speeding of the load, as the field is reduced due to bad contact. It also prevents heavy current kicks on the armature if the series field circuit suddenly opens out due to a break at the cross-bar collector. The setting of the relay to 40 volts is so selected that sufficient allowance for natural contact conditions of the collector is made.

It should be noted that it is also possible to transfer the connection from 1E contactor to 2E dynamic braking contactor. The operation of the relay even then will be absolutely the same, through it will not then take care of the condition of CB2 crossbar collector. The protection will also become ineffective in case CB1 crossbar collector is broken and remains undetected.

RELAY LLR (LIMIT LOWERING PROTECTION)

The second relay claimed under this invention is termed LLR relay. This relay is also a magnetic voltage relay with double coils, similar to relay OSR, with the difference that the coils are designed for different ampere-turns. The connections are shown in the drawing. The LLR3 coil of the relay LLR is connected with one terminal to the positive contact of the contactor L i. e. to the common point between contacts H1 and L1 of contactors H and L. The other terminal of coil LLR3 is taken to the negative terminal of the coil M4 of the main contactor M. Normally-open contacts CR1 of the relay CR are interposed in series with the coil LLR3 of the relay LLR, i. e., the operation of the relay is controlled by the relay CR.

The coil LLR2 of LLR is connected across a variable resistance marked G. The resistance is connected between contactors L and 2E, to the same points to which coil OSR2 of relay OSR is connected.

The LLR3 coil is so designed and the relay LLR adjustment so made that the relay pulls in at 200 volts across the main lines of the power supply. The resistance tapping on the resistance G is then so adjusted that the coil LLR2 can hold the relay pulled in up to 70 volts across the terminals of resistance G. Thus the relay functions between 70 and 200 volts i. e., at 200 volts it pulls in and at 70 volts it drops out.

The relay LLR has one set of normally open contacts LLR1 connected in series with the contacts OSR1 of relay OSR, controlling the main contactor M. When LLR1 contacts open, the relay drops out the main contactor M and de-energises the whole panel as explained above.

OPERATION OF LLR RELAY

*Condition b.—Overspeeding due to turning over of limit switch as explained under OSR relay function*

The relay LLR is supplementary to relay OSR as far as condition b is concerned. However, the LLR relay is effective only from the 3rd notch of the master switch during lowering. On the 3rd notch lower of the master switch, the control relay CR, which is a fixed time-delay relay gets de-energized and opens its contacts CR1 after a fixed time-delay. When CR1 contacts open, the coil LLR3 of the relay LLR is de-energised. However, the relay LLR is held in by the coil LLR2 which is connected across the motor armature. The CR relay gives time to the armature to speed up to develop sufficient voltage to hold-in the LLR relay by its LLR2 coil.

If, however, the overhoist limit switch turns over during lowering, as explained above under OSR relay, from 3rd notch onwards the voltage conditions after the limit switch has turned over are such that LLR relay is not able to hold in and drops out, opening its contacts LLR1. This opens out the main line contactor M and de-energises the whole control panel. The action is so fast that the brake drops and stops the hoist even before the limit switch has completely turned over.

It should be noted that the limit switch resistance 13 in series with contacts 2LS can break any time and remain undetected. Under that condition, the relay OSR may not get sufficient voltage to pull in when the limit switch has turned over while lowering heavy loads. Relay LLR thus supervises the operation of OSR under such abnormal conditions.

*Condition c.—Overspeeding due to grounding of motor series field or its line connecting terminals between series field coils and series brake coil*

When such a fault occurs and it does take place in actual practice, the brake gets power and remains lifted, while the series field fails. In case of a controller with armature reversal control, this is a very dangerous fault, as the brake will drop only when the emergency control switch is opened.

However, in my invention if the series field tends to fail, the armature voltage approaches zero, and the relay LLR at once drops out opening its LLR1 contacts, disconnecting the whole motor from the line. The action again becomes very fast and effective.

SUPERVISION OF MINIMUM VOLTAGE

The coil LLR3 of relay LLR is designed to pull in at 200 volts. Thus if the main voltage is below 200 volts, the panel will fail to function. A mill type series motor is sensitive to variation of line voltage, as the speed varies to an appreciable extent with change in voltage.

If, therefore, the voltage goes down, the hoisting speed of the motor is reduced i. e., the "time operation" of the cycle is very much increased. The field resistances are also designed for the normal voltage of about 230 volts. The motor with heavy loads on the hook will therefore tend to overspeed during lowering due to its field current being reduced on account of low voltage.

The relays LLR and OSR supervise the line voltage conditions of the crane between 200 and 260 volts, the normal voltage being 230 volts. When the voltage condition either becomes too low or to high, the relays function and draw the attention of the operator to the abnormal condition.

The invention has the following advantages:

1. The relays OSR and LLR are preferably made standard magnetic voltage relays used on overhead cranes for convenience of operation and maintenance.

2. The relays OSR and LLR can be introduced on any standard controller, using 5 trolley crossbar collectors and power type overhoist limit switches.

3. The relay OSR protects the hoist against dangerous overspeeding due to failure of dynamic braking action of the motor if armature crossbar current collector breaks or an accidental open circuit occurs beyond that point.

4. The relay OSR makes an extra trolley crossbar collector as a parallel standby unnecessary and redundant.

5. The relay OSR protects the hoist from overspeeding if the overhoist limit switch accidentally turns over during lowering heavy loads. The relay is effective already from 2nd notch of the master switch.

6. Relay OSR prevents the operator from resetting the overhoist limit switch beyond the 1st notch of the master switch, thus eliminating heavy current kicks on the motor armature, which are common on all other standard controllers.

7. Relay OSR supervises the contact condition of the series field-series brake circuit trolley crossbar collector, and prevents overspeeding or heavy current kicks on the armature, if that collector causes a break or introduces heavy resistance due to bad contact surface.

8. The relay LLR protects the hoist from overspeeding due to turning over of the limit switch under any condition of the main circuit. It is, however, effective only after the controller is moved to the 3rd notch lowering. The relay thus serves as a standby protection to the relay OSR.

9. The relay LLR protects the hoist against overspeeding if the series field gets shorted due to ground faults.

10. The relay LLR supervises the minimum voltage of the crane, protects it against too low voltage conditions below the setting of the relay, i. e., 200 volts.

Having now particularly described and ascertained the nature of my said invention and in what manner the same is to be performed, I declare that what I claim is:

1. In a magnetic hoist controller employing an electrical circuit combining a direct current motor, a source of energy and a normally operable master switch to connect the motor as a series motor while hoisting and as a shunt motor while lowering and provided with a series connected electro-mechanical brake, means responsive to the voltage across the motor armature and to the voltage drop across the motor series field so that whenever the voltage across the armature or across the series field rises above a predetermined value due to faults in the motor control circuit, the said means automatically rendering the motor control ineffective by disconnecting the motor from the energy source and de-energizing the electro-mechanical brake which instantaneously holds the motion.

2. In a magnetic hoist controller employing an electric circuit combining a direct current motor, a source of energy and a manually operable master switch to connect the motor as a series motor while hoisting and as a shunt motor while lowering and provided with a series connected electro-mechanical brake, means responsive to voltage during the lowering of a load, a two coil relay, one coil of the said relay connected across the motor armature and responsive to the armature voltage and the other coil connected across the motor field and responsive to the voltage drop across the field, means to automatically disconnect the motor from the source of energy in case the motor while lowering a load, fails to exert its dynamic braking action due to a sudden break in its armature loop circuit or due to sudden failure of its exciting field, the said means instantly de-energizing the electro-mechanical brake to hold the motion.

3. In a control system for hoisting service as claimed in claim 2, means of disconnecting the motor from the source of energy and preventing the sudden overspeeding of the motor when lowering an overhauling load due to the said failure of dynamic braking action, the method of connecting the two coil electro-magnetic relay wherein, one coil is connected across the armature of the motor so that one of its terminals is connected to the positive power line to a point on the common connector between the directional electro-magnetic contactors, one of which being the hoisting contactor and the other being the lowering contactor, the other terminal of the said coil being connected in series connection with a variable control resistance to one pole of the spring-closed electro-magnetic contactor controlling the main dynamic braking circuit forming a parallel diverter to the motor armature and connected to the trolley cross bar collector between the motor armature and the said spring-closed electro-magnetic contactor, the second coil of the said relay being connected to the terminal of the first coil that is connected to the positive power line to the common connector between the directional hoisting and lowering electro-magnetic contactors, whereas the other terminal of the said second coil is wired in series with normally open auxiliary contacts of the said spring-closed electro-magnetic contactor controlling the main dynamic braking circuit forming a parallel diverter to the motor armature, and then connected to one pole of the electro-magnetic contactor controlling the motor series field circuit in the lowering direction such that the said second coil gets connected across the circuit formed by the motor series field, the operating coil of the electro-magnetic series brake and the corresponding trolley cross-bar collector in series connection in the lowering direction, the normally closed main contacts of the said two coil relay being connected in the energizing coil circuit of the main line electro-magnetic contactor controlling the main power to the motor so that when said relay contacts are open, the power to the motor is disconnected.

4. In a magnetic control system for hoisting service employing a direct current motor connected to a source of energy and worked as a straight series motor while hoisting and as a shunt motor while lowering giving dynamic braking action, and provided with a direct acting series connected four contact counter-weight balanced overhoist limit switch and a series type electro-mechanical brake, means responsive to the voltage during lowering of a load, a two coil relay, one coil of the said relay connected across the power lines, and the other coil connected across a variable resistance, the said resistance itself being connected across the motor armature and responsive to the voltage across the armature, means to automatically de-energize the whole control and disconnect the motor from the energy source in case the initial voltage of the energy source is below a pre-set minimum value or in case the voltage across the armature drops below a pre-determined minimum value caused by wrong operation of the overhoist limit switch which removes the dynamic braking action of the motor causing extreme overspeeding due to gravity action on the load, the said means automatically de-energizing the electro-mechanical brake which instantly holds the motion.

5. In a control system for hoisting service as claimed in claim 4, means for preventing the operation of the motion of the hoist with low initial supply voltage, or for stopping the motion in case of failure of the motor series field while lowering a load, the method of connecting the said two coil electro-magnetic voltage relay wherein, one coil is connected across the main power lines so that one of its terminals is connected to the positive power line to a point on the common connector between the directional electro-magnetic contactors, one of which being the hoisting contactor and the other the lowering contactor, whereas the other terminal of the same coil taken in series connection over normally open contacts of an electro-magnetic time-delay relay, is connected to the negative terminal of the operating coil of the main line electro-magnetic contactor in the main power circuit of the control, the said electro-magnetic time delay relay being provided as a control relay to permit the said voltage relay to function in proper sequence, the second coil of the said voltage relay being connected across a variable control resistance, the said control resistance itself being connected with one terminal to the same point to which the terminal of the first coil of the said relay is connected, while the second terminal of the said control resistance is connected to one pole of the spring-closed electro-magnetic contactor controlling the main dynamic braking circuit forming a parallel diverter to the motor armature and connected to the trolley cross-bar collector between the motor armature and the said spring-closed electro-magnetic contactor, so connected that the said second coil comes in effect across the terminals of the motor armature, the normally open main contacts of the said two coil relay being connected in the energizing coil circuit of the main line electro-magnetic contactor controlling the main power circuit to the motor so that when the said relay contacts are open the power to the motor is disconnected.

KAI-KOBAD S. KUKA.

REFERENCES CITED

The following references are of record in the file of this patent:

UNITED STATES PATENTS

| Number | Name | Date |
| --- | --- | --- |
| 1,709,102 | Waite et al. | Apr. 16, 1929 |
| 1,781,792 | Rodman | Nov. 18, 1930 |